United States Patent [19]
Catto

[11] Patent Number: 5,865,259
[45] Date of Patent: Feb. 2, 1999

[54] ELECTRICALLY POWERED EARTH CORER

[75] Inventor: Christopher John Dignet Catto, Elsworth, United Kingdom

[73] Assignee: Rotacon Plc, Cambridge, United Kingdom

[21] Appl. No.: 875,789

[22] PCT Filed: Feb. 14, 1996

[86] PCT No.: PCT/GB96/00318

§ 371 Date: Jul. 30, 1997

§ 102(e) Date: Jul. 30, 1997

[87] PCT Pub. No.: WO96/25026

PCT Pub. Date: Aug. 22, 1996

[30] Foreign Application Priority Data

Feb. 15, 1995 [GB] United Kingdom .................... 9502956

[51] Int. Cl.⁶ ................ A01B 45/00; E21B 12/06
[52] U.S. Cl. ................................ 172/25; 172/22
[58] Field of Search ....................... 172/21, 22, 25, 172/371, 378; 171/21, 22; 294/50, 50.5, 50.7

[56] References Cited

U.S. PATENT DOCUMENTS

| 3,444,934 | 5/1969 | Alberto . | |
|---|---|---|---|
| 3,525,546 | 8/1970 | Lowell . | |
| 4,723,802 | 2/1988 | Fambrough . | |
| 4,832,131 | 5/1989 | Powell et al. | 172/25 |
| 4,947,938 | 8/1990 | Fricke et al. | 172/22 |
| 4,958,688 | 9/1990 | Marrow et al. | 172/22 |
| 5,261,496 | 11/1993 | Smotherman | 172/25 |
| 5,322,130 | 6/1994 | Ryden | 172/378 |

FOREIGN PATENT DOCUMENTS

| 2264467 | 10/1975 | France . |
|---|---|---|
| 2122462 | 1/1984 | United Kingdom . |

Primary Examiner—Thomas B. Will
Assistant Examiner—Robert Pezzuto
Attorney, Agent, or Firm—Howson and Howson

[57] ABSTRACT

An electrically powered earth coring device may be used to remove weeds from lawns or flower beds. The device comprises a hollow shaft 3 having a handle 1 and a hollow cylindrical cutter 5, extensible from the lower end of the shaft to penetrate the ground around the root of a weed 34 and create a core of earth. When a preset depth has been reached, the cutter 5 is retracted in order to remove the core of earth and the weed from the ground. A plunger 16, mounted inside the shaft 3, pushes the core of earth out of the cutter as the latter is retracted. Opposing claws may be mounted pivotally at the lower end of the cutter 5 in order to grip the root of the weed. The coring device may also be used for planting bulbs.

18 Claims, 6 Drawing Sheets

ELECTRICALLY POWERED EARTH CORER

BACKGROUND TO THE INVENTION

This invention relates to an electrically powered earth corer. It is considered that the invention will mainly be used for removing weeds from lawns or flower beds and in this description the earth corer is therefore referred to as a "weeder". However, the invention is by no means limited to a weeder.

Removal of weeds from lawns can be done either mechanically or by use of herbicidal poisons. Poisons, which can be environmentally unfriendly leave the body of the weed in the ground, although dead, which can be unsightly. Mechanical methods of removing weeds include simple manual pulling or digging out with a trowel, or similar tool. Particularly when the weed is deep-rooted, manual pulling often results in a breakage of the weed leaving at least some part of the root remaining in the ground due to the friction of the surrounding earth on the weed. This root will almost certainly re-grow. Digging out the weed with a trowel is more effective at removing the weed as it removes the surrounding earth together with the weed. But removing a weed in this way requires a sizeable hole to be dug in the lawn which can be more troublesome than the original weed.

There are known devices that purport to assist in the removal of deep rooted weeds, without creating a large hole. These operate by the insertion of a thin spike down the centre of the weed. Attached to this spike is a blade which is designed to close on the root of the weed when pulled up and thus remove the weed and root together. One drawback with these devices is that if the weed is firmly rooted the blade fails to adequately grasp the root and merely slips along the length of the root as it is pulled up, failing to remove the weed. Effective operation is also very dependent upon soil conditions.

SUMMARY OF THE INVENTION

According to the present invention there is provided an electrically powered device for removing a core of earth from an area of ground, comprising a shaft having a lower end, and an elongated hollow cutter extensible by means of electrical power with respect to the lower end of the shaft so as to penetrate the ground and create a core of earth surround by the cutter and supported therein such that removal of the cutter from the ground also removes the core, the cutter being retractable relative to the shaft. The device therefore can be used to remove a small core of earth around the root of a weed, together wish the weed, thus greatly assisting in the weed removal by removing the earth around the weed, but only leaving a minimal mark on a lawn. The small cylindrical hole left in the lawn can be back filled with the earth removed with the weed, once the weed has been removed therefrom. However, the device can also be used for purposes other than weeding, such as planting bulbs.

Preferably, the device includes means for sensing when a required extension has been reached by the cutter and an automatic retraction mechanism that operates on reaching this extension, or alternatively if a stone or other obstruction is encountered. The sensing means may operate by sensing the force or torque applied to the cutter.

Conveniently, the cutter is cylindrical and is arranged to rotate as it penetrates the earth in a drilling action. The lower end of the cutter may have teeth that project outwards in order to reduce friction between the cutter and the surrounding earth. Such teeth will still maintain a good grip on the core of earth inside.

The device may also include automatic means for removal of the core of earth from the cutter once the cutter has been retracted.

The cutter preferably includes opposing members pivotally mounted at the lower end thereof, movable between an open position and a closed position and arranged to be in the open position during penetration of the ground and to be in the closed position during removal of the cutter from the ground.

To deal with tough weeds, such as tree seedlings, the opposing members may comprise a set of claws to grip the root of the weed when retraction commences.

BRIEF DESCRIPTION OF THE DRAWINGS

Specific embodiments of the invention will now be described by way of example with reference to the accompanying drawings, in which.

DETAILED DESCRIPTION OF THE PREFERRED EMBODIMENTS

Figure 1:
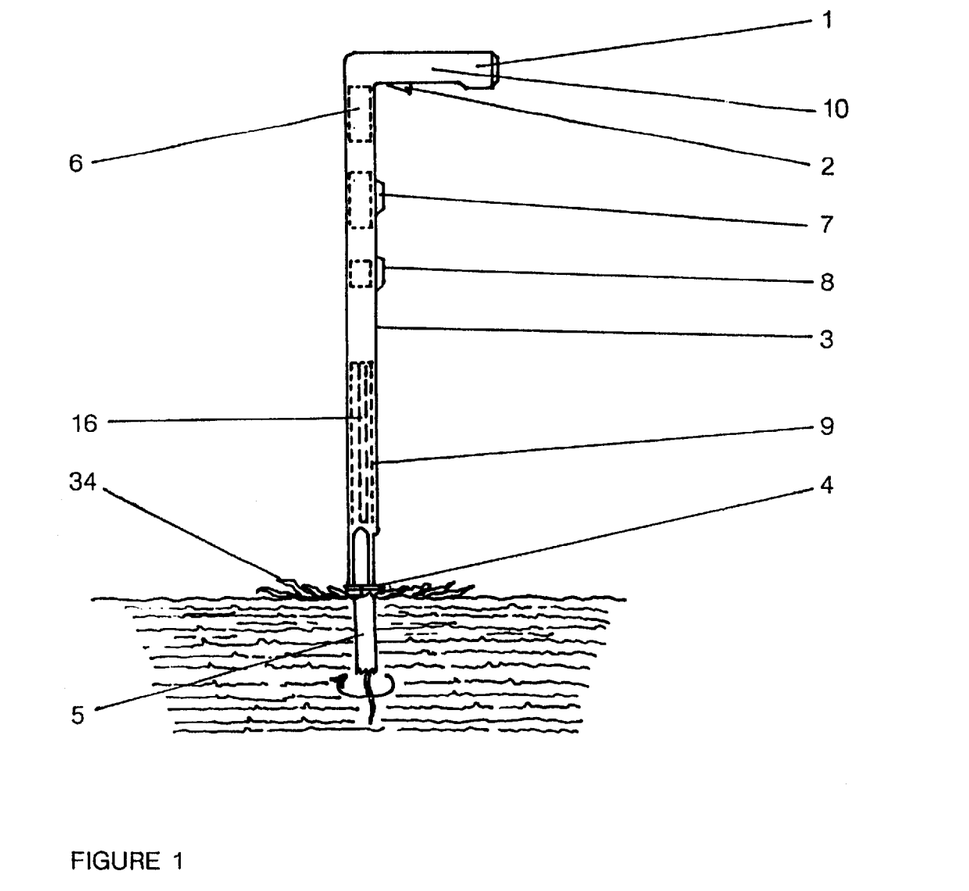
FIG. 1 shows an overall side view of an electric weeder according to the invention.

Referring to FIG. 1, there is shown a side view of an electric weeder comprising a handle 1 joined to a rigid shaft comprising a tube 3, containing a motor 6 capable of driving a drilling mechanism 9. Attached to the base of the tube 3 is a hollow annular foot 4 which in operation is pressed onto the centre of a weed 34 that is required to be removed. Mounted in the handle 1 is a trigger 2 which activates the motor 6 and thus the drilling mechanism 9. The trigger 2 allows the weeder to be started or stopped as desired by the user. On activation of the trigger 2 the drilling mechanism 9 causes a cylindrical cutter 5 to 'corkscrew' down through the earth around the root of the weed. This cutter 5 has teeth on its cutting edge that project outwards in order to reduce friction to the surrounding earth whilst still maintaining a good grip on the earth inside. Upon reaching a pre-set depth, (typically 120 mm) governed by a depth-stop adjustment 8 and sensed by a sensor-switch 7, the motor 6 is reversed and the cutter 5 is drawn back within the tube 3 by the mechanism 9. In order to deal with different varieties of weeds or soil conditions, the pre-set depth may be adjusted using the adjustment 8 which moves the point at which the sensor switch 7 is tripped. Once the cutter 5 is fully retracted the weeder can be lifted off the ground. After a slight delay, the motor 6 causes the cutter 5 to move upwards relative to a central plunger 16 pushing out the stem and root of the weed and the core of earth. Once the bottom of the cutter 5 reaches a level near the bottom of the plunger 16, the sensor-switch 7 will sense this and once again reverse the motor 6 extending the cutter to its original position.

When the cutter has reached the end of its cycle an indicator, which may be visual or aural, informs the operator that the weeder is ready for use on another weed. The same indicator may tell the operator when the cutter 5 has been initially retracted to its original position after pulling up the weed so that the weeder can be lifted off the ground, if so desired.

The trigger 2 allows the motor 6 to be switched off at any stage. The operator releases this trigger 2 on receiving the indication that the device has completed its cycle. The operator may also release the trigger after lifting the weeder but before the weed is ejected, to allow the weed to be ejected into a barrow or other receptacle.

To assist in aiming at the centre of the weed, the foot 4 preferably defines an aperture at the bottom of the tube 3 approximately 40 mm in width. This also reduces the chances of clogging or jamming the mechanism. The leaves or fronds of the weed, cut off by the cutter 5 can be lifted up and removed by hand or alternatively a set of barbs could be provided on the underside of the foot for picking up these stray fronds.

The stem and root of the weed can be shaken free from the core of earth which can then be used to back-fill the small circular hole left in the lawn due to the weed's removal. It may be preferable to leave the hole void for a period to reduce the risk of any remaining root re-growing.

For convenience the device is powered by a re-chargeable battery pack 10 conveniently mounted in the handle 1 but a mains powered version is an acceptable alternative. The drilling mechanism 9 and motor 6 can be designed to fit within a tube of approximately 300 mm in length, however for convenience of operation and to avoid the user having to bend down it is envisaged that the tube 3 would be around 900 mm in length.

Figure 2:
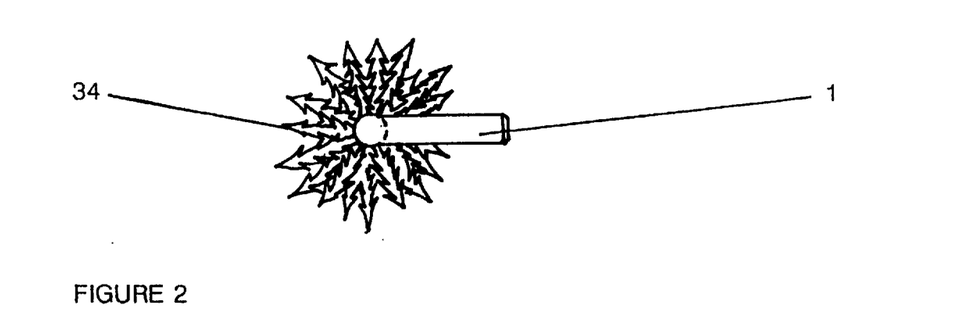
FIG. 2 shows an overhead view of the electric weeder shown in FIG. 1.

Referring to FIG. 2, there is shown a view from above of the same device as shown in FIG. 1, showing the location of the tube 3 and foot 4 over the centre of the weed 34.

Referring to FIGS. 3, 4 and 13 to 15 there are shown detailed sectional views of the device described with respect to FIG. 1. A re-chargeable battery 10 is shown mounted in the handle 1. The motor 6 may also be mounted in the handle 1 or in the tube 3 as shown. This tube 3 can be of metal or plastic with metal inserts as necessary. The motor 6 is coupled to a reduction gearbox 11, which in turn is joined, or drive shaft 19. This drive rod 19 has a non-circular cross-section, for example square, hexagonal or formed with a keyway, to enable it to engage in and drive a threaded collar 17. As a result the threaded collar 17, together with an attached tubular sensor link 32, travels up or down inside a threaded section 18 when the motor 6 turns. The threaded collar 17 drives a coupling 13 via a torque-limiter 14, and the sensor link 32 provides a means of tripping the sensor switch 7, for instance, by encouraging a sleeve 22 to travel downwards. The depth stop adjustment 8 can also interact with the sleeve 22, for instance by making vanes 21 rub against it.

Figure 3:
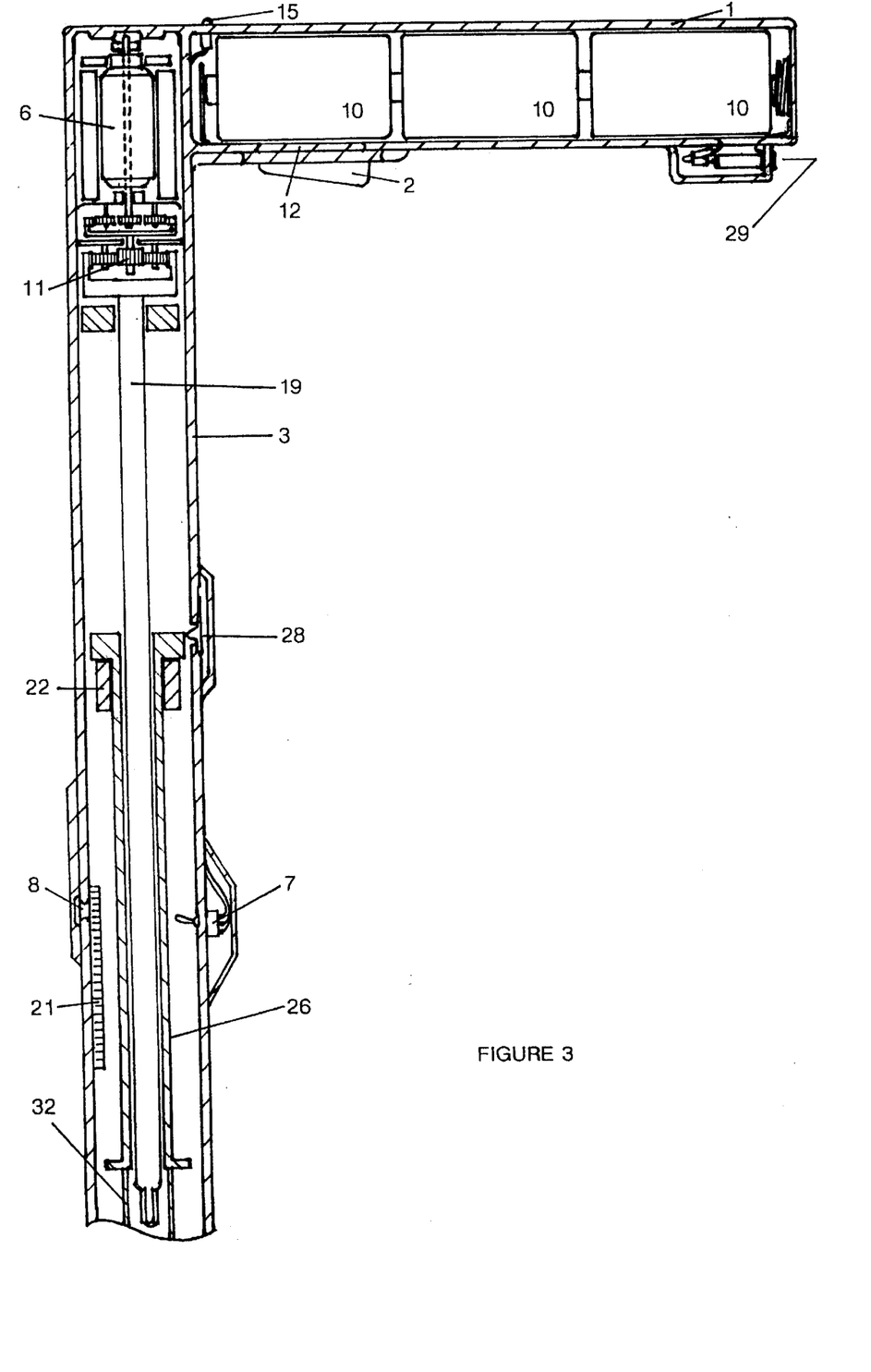
FIG. 3 shows a detailed sectional view of the upper part of the electric weeder.
Figures 4, 13, 14, 15:
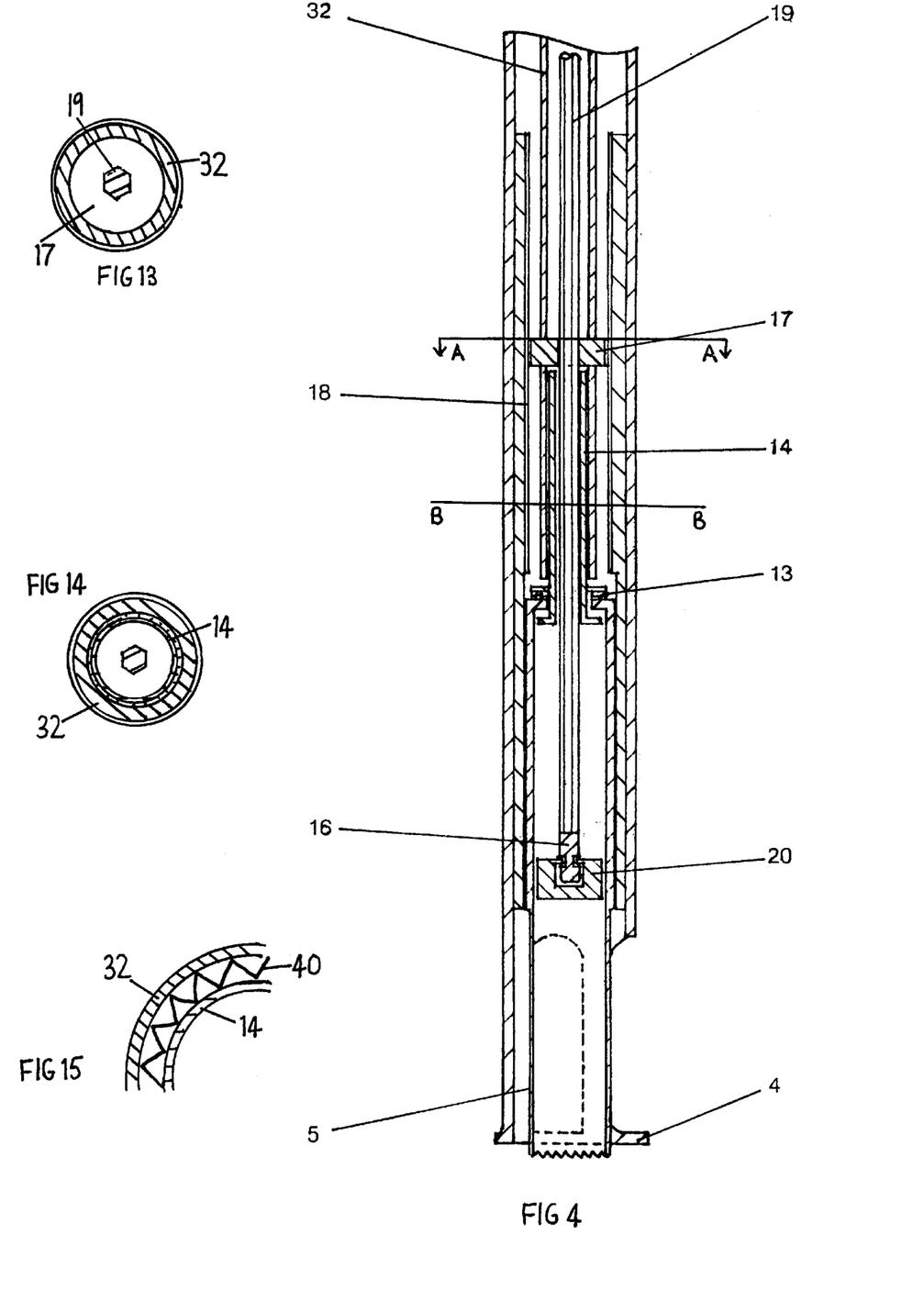
FIG. 4 shows a detailed sectional view of the lower part of the electric weeder.
FIG. 13 is a transverse section taken along the line A—A in FIG. 4, viewed in the direction of the arrows.
FIG. 14 is a transverse section taken along the line B—B in FIG. 4.
FIG. 15 is an enlarged view of part of FIG. 14.

The sleeve 22 is furnished with a coarse thread that runs on a sensor actuator 26 and this thread has opposite sense to that on the threaded collar 17 and the threaded section 18. Therefore if the sleeve 22 encounters friction with the vanes 21 while the threaded collar 17 is descending, it is itself caused to descend relative to the sensor actuator 26. As a consequence the sensor switch 7 is flicked down somewhat earlier than it would have been otherwise.

As shown in FIG. 15, the gap between the torque limiter 14 and the sensor link 32 is filled with a sprung material 40 of corrugated shape, or alternatively with grease. If a pre-determined torque is exceeded because the cutter 5 has struck an obstruction, slippage takes place between the torque limited and the sensor link 32. The cutter 5 stops rotating and its teeth are therefore not blunted on the stone or other obstruction. The torque limiter continues to drive vertically and the weeder is pushed up into the operator's hands, thus indicating that an obstruction has been met.

The motion can be stopped at any instant by releasing the trigger switch 12. Also an audible or visible indicator 15 alerts the operator at certain key moments of the process, depending upon the position of the sensor actuator 26 relative to an indicator switch 28. The coupling 13 is designed such that the cutter 5 is rotated whilst it is being driven into the ground, but not when it is being withdrawn. This is achieved by means of teeth on the coupling 13 and correspondingly on the upper face of the cutter 5.

The plunger 16 on the end of the drive rod 19 engages in a piston 20 and is preferably captive, yet free to rotate within it, as shown. This facilitates expulsion of the earth from the cutter 5 when the threaded collar 17 moves upwards inside the threaded section 18. The lip at the bottom of the torque limiter 14 engages with the cutter 5 in order to raise it.

The foot 4 of the tube 3 is cut away as shown, so that the operator can centre the cutter 5 on the weed more easily and to reduce the chances of earth clogging the mechanism. For the same reason the sliding and threaded parts of the mechanism are deliberately located up the tube away from the cutter.

Figure 5:
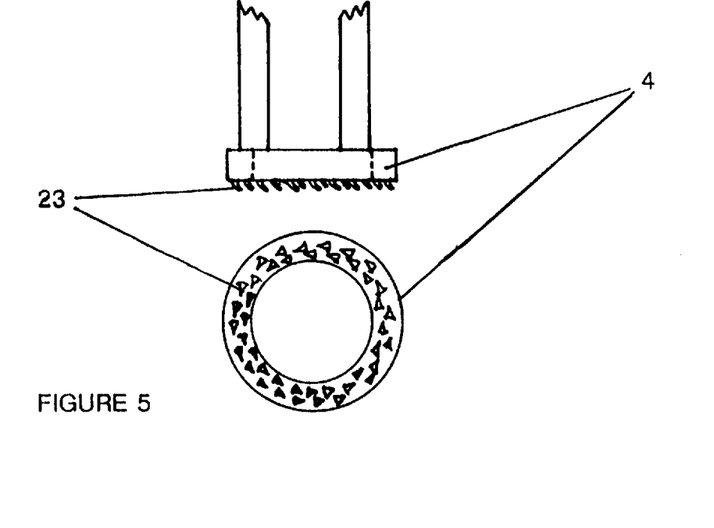
FIG. 5 shows detailed sectional and plan views of the lower end of the weeder showing a set of barbs.

FIG. 5 shows barbs 23 mounted under the foot 4 of the tube, for the purpose of lifting fronds or leaves of the weed after drilling.

Figure 6:
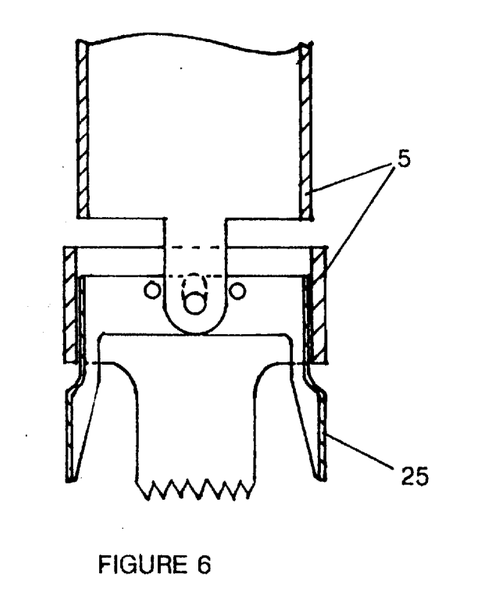
FIG. 6 shows a detailed sectional view of claws located at the bottom of the cutter in the open position.
Figure 7:
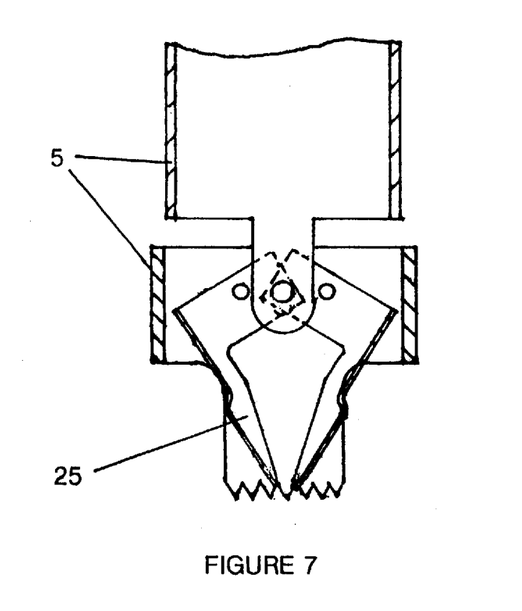
FIG. 7 shows a detailed sectional view of the claws shown in FIG. 6 in the closed position.

FIG. 6 and FIG. 7 show a method of mounting claws 25 inside and at the bottom of the cutter 5, shown in their open position in FIG. 6. When the cutter tube 5 descends, these claws 25 are forced open by the pivot mechanism, but when it ascends they are pulled into the closed position, as shown in FIG. 7. As a result the root of the weed is gripped. Once the cutter tube 5 is out of the ground there is then negligible force pulling the weed down, thus when the plunger starts to expel the earth the claws open outwards again and the weed is released.

Figure 8:
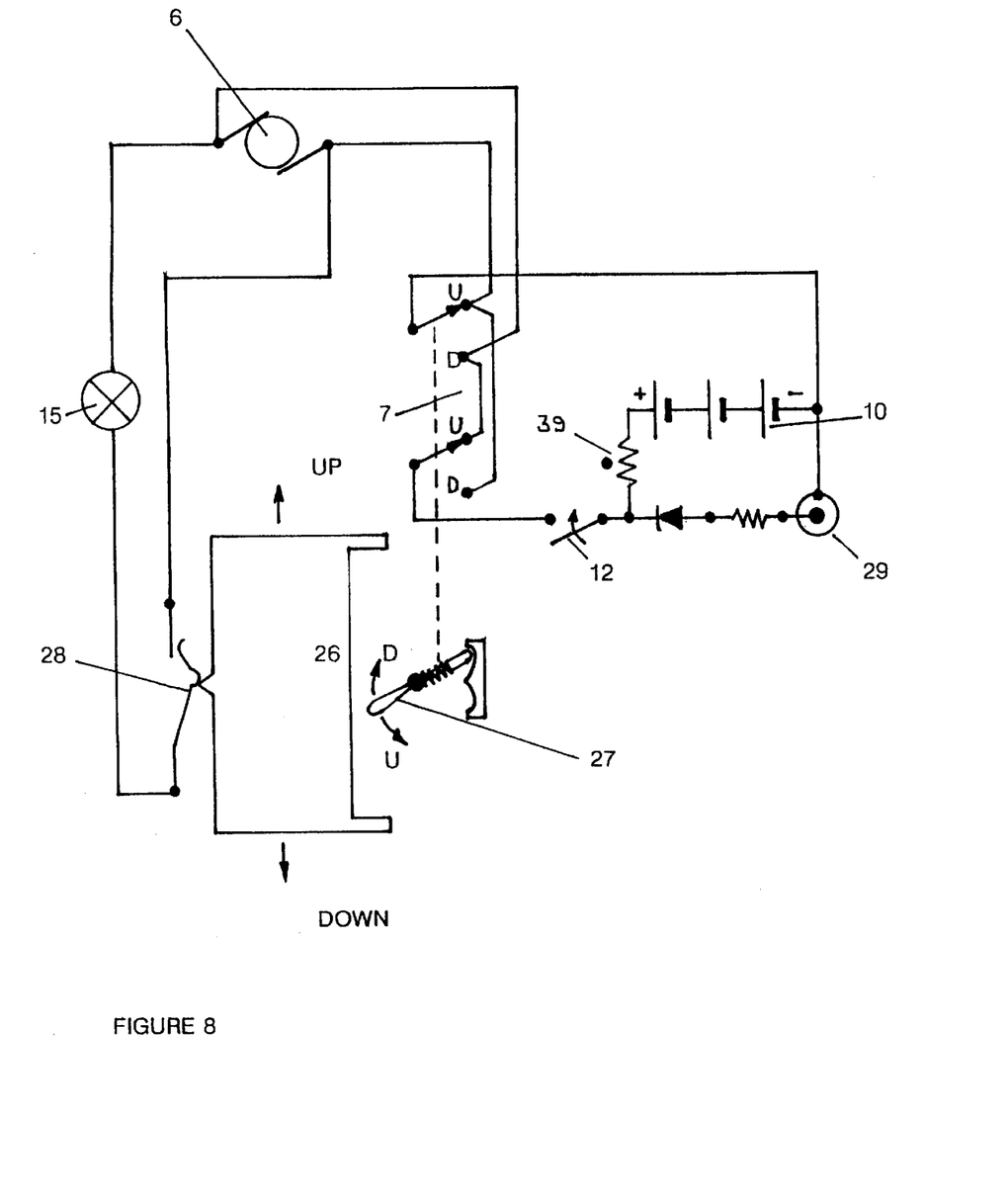
FIG. 8 is a diagram of one form of electrical circuit to control the motor of an electric weeder.

Referring to FIG. 8 there is shown a schematic diagram of one example of a control circuit for an electrically powered weeder. On activating the trigger switch 12 the motor 6 starts to turn, moving the actuator 26 together with the cutter downwards. At a pre-set depth the toggle 27 of the sensor switch 7 is flicked over by the actuator 26 so that the sensor switch 7 goes into the up mode, as drawn. This causes the motor 6 to reverse and draw the cutter together with the actuator 26 upwards. The instant the cutter is clear of the ground a projection on the actuator 26 closes an indicator switch 28 causing the indicator 15 to beep or flash to tell the operator that the weeder should be lifted up so that the tube is off the ground. The motor 6 continues operating and the earth and weed are expelled from the cutter tube as described above. The actuator 26 then reaches the top of its travel and consequently the toggle 27 for the sensor switch 7 is flicked back so reverting to the down mode. The motor's direction of rotation then returns to that at the start of the cycle. This causes the actuator 26 and cutter to move downwards again. When the projection on the actuator 26 reaches the indicator switch 28 it activates the indicator 15 again which alerts the operator that the cutter is flush with the foot of the tube ready to start the cycle over again. At this stage the operator should release the trigger 12 and move the weeder to the next weed.

The rechargeable battery 10 is connected to a charger via a connector 29. Indicator 15 is preferably wired after the trigger switch 12 so that there is no chance of the battery being inadvertently drained should the actuator 26 come to rest with its projection holding the indicator switch 28 closed. A thermistor 39, with a positive temperature coefficient of resistance, limits the current to the motor 6 in the event of the motor drawing an excess current due to the appearance of an excess torque.

The simple arrangement illustrated in FIG. 8 using a double-pole double throw toggle switch is reliable, cost effective and efficient. The precise form of this switch may be altered to include sliding and fixed contacts making up other parts of the overall assembly, but it is preferable to include an over-centre spring or some equivalent device so as to ensure a precise and dependable snap-action.

Figure 9:
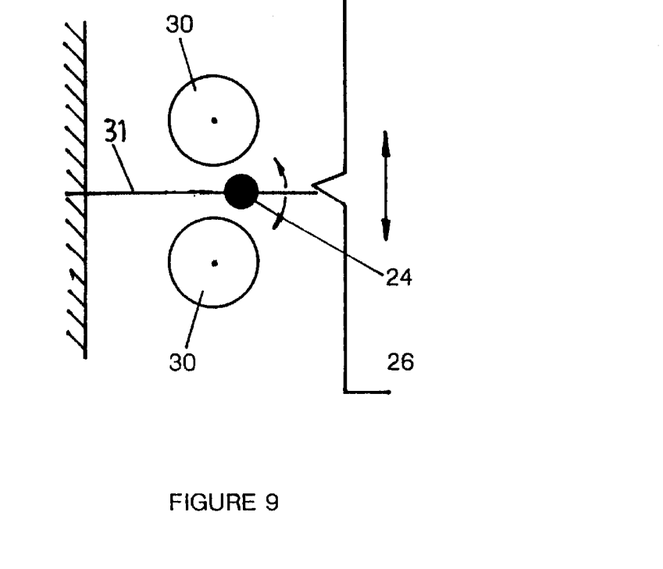
FIGS. 9 to 12 respectively show a two-tone mechanical bell, a schematic representation of a light bulb indicator, a schematic representation of an LED visual indicator and a schematic representation of a two-tone audible indicator, each for indicating that the cutter is in certain positions.

Referring to FIG. 9 there is shown an enlarged view of one embodiment of a possible mechanical audible indicator mechanism. As the actuator 26 moves up and down the projection on its side engages a resilient strip 31 both when the soil is clear of the ground and again when the earth and weed have been expelled. Flexing of this strip 31 causes a hammer 24 shown on the strip to strike the bells 30 sounding them. Ideally there are two bells 30 of different weights which chime in a different order on the way up and on the way down.

Figure 10:
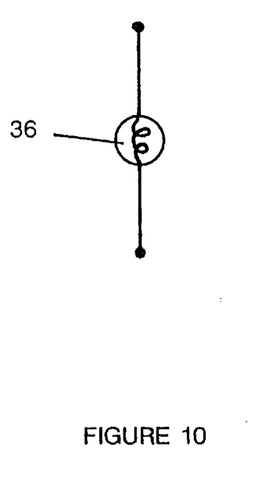
Figure 11:
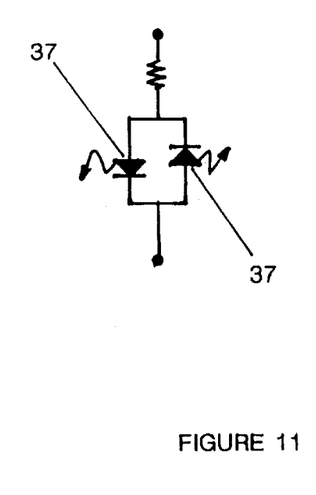
Figure 12:
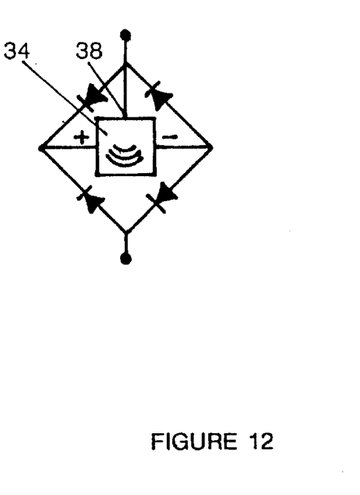

FIGS. 10, 11 and 12 show in more detail alternative examples of electrically operated indicators 15 as shown in FIG. 8. FIG. 10 shows a simple bulb 36. Better indication is achieved by the arrangement shown in FIG. 11 where a pair of Light Emitting Diodes 37 are shown, alternatively a bi-colour LED could be employed.

FIG. 12 shows an arrangement for a two-tone sounder 33 which could be employed as an indicator. Most sounders consist of an oscillator driving a transducer and generally require a DC supply of appropriate polarity, hence a diode bridge is employed as shown. Also certain sounders have an extra terminal 38 for changing the frequency or modulation. Advantage of this can be taken as shown in FIG. 12 by connecting this terminal 38 to one of the diode bridge inputs, the tone being altered on the up and down travels of the actuator.

The indicators of FIGS. 11 and 12 provide this useful directional indication when used in the circuit illustrated in FIG. 8 as the indicator 15. The indicator 15 is powered from the terminals of the motor 6, which are supplied with alternate polarities dependent upon the state of the sensor switch 7. It is possible to connect the indicator 15 to a fixed polarity, for instance on the other side of the sensor switch 7, to save the cost of extra diodes, but then the directional indication facility is lost.

Whilst specific embodiments have been described, it will be appreciated that modifications may be made thereto without departing from the scope of the invention as defined by the appended claims.

For example, instead of the plunger 16 remaining stationary whilst the cutter 5 moves upwards, the plunger could move downwards inside the cutter to push out the stem and root of the weed together with the earth.

The trigger 2 could be connected to an electronic circuit which automatically controls the cycle including switching off the motor when the cycle is complete. This would remove the need for the operator to release the trigger on receiving an indication that the device has completed its cycle.

In a particularly advantageous modification, the mechanism could be simplified if retraction of the cutter 5 were to be triggered manually only after the device is lifted from the ground. This would allow the plunger 16 to be located with its lower end level with the bottom of the shaft. In this arrangement, the audible/visual signal indicates when the cutter reaches the bottom of its stroke, and the motor is switched off either automatically or manually to leave the cutter fully extended from the shaft with an earth core contained therein. The operator then withdraws the weeder with its trapped earth core from the ground and positions it over a receptacle. Retraction of the cutter and ejection of the core with its weed commences when the trigger is pressed again.

Instead of the torque-limiter 14 shown in FIG. 4, a system relying on springs can be used. The motor mechanism and battery could be protected by means other than the thermistor 39, for example, a conventional bi-metallic trip switch, a fuse or a re-settable over-current protector such as the Polyswitch (Trade Mark) manufactured by RayChem. This device would be connected in series with one of the leads for the battery.

The engagement between the coupling 13 and the cutter 5 may be effected by friction surfaces rather than teeth. If a hammering motion is preferred, the teeth can be replaced by suitably shaped humps on the mating surfaces. If it is not important to prevent rotation of the cutter 5 during withdrawal then the coupling 13 can be integrally connected thereto.

An alternative torque limiter could be mounted within the threaded collar 17 and would still be arranged to slip under excess torque. The cutter would neither rotate nor be pushed down and the presence of an obstruction would be indicated by a change in engine noise.

As an alternative to the circuit shown in FIG. 8, an electronic switching method could be used in which transistors supply current to the motor in the required direction. The transistor circuitry could also be used to reverse the motor on detecting excess torque.

With no, or at most little, conversion, the device described could be used for transplanting small plants so the references to "weed" throughout should be taken to mean a plant which is removed from an earth site but not necessarily removed for disposal.

The device could also be used for planting bulbs, by removing a core of earth, inserting a bulb into the resulting hole and then replacing the core of earth. For bulbs of different sizes cutters of different diameters could be interchangeably fitted to the device.

I claim:

1. An electrically powered device for removing a core of earth from an area of ground, comprising a drive shaft having a lower end an elongated hollow cutter and a hollow tube, wherein the hollow cutter is extensible by means of electric power with respect to said hollow tube and the lower end of the drive shaft so as to penetrate the ground and create the core of earth at least partially surrounded by the cutter and supported therein such that removal of the cutter from the ground also removes the core, the cutter being retractable relative to the drive shaft.

2. A device as claimed in claim 1 wherein retraction of the cutter is also electrically powered.

3. A device as claimed in claim 1 including means for sensing when a required extension has been reached by the cutter.

4. A device as claimed in claim 3 including means for automatically retracting the cutter in response to sensing that the required extension has been reached.

5. A device as claimed in claim 1 wherein the cutter is cylindrical and is arranged to rotate as it penetrates the ground in a drilling action.

6. A device as claimed in claim 5 wherein cutters of different diameters can be interchangeably fitted to the device.

7. A device as claimed in claim 5 including means for sensing the torque applied to the cutter and terminating rotation thereof if the torque reaches a predetermined value.

8. A device as claimed in claim 1 wherein the cutter is arranged to be retracted without rotating.

9. A device as claimed in claim 1 wherein the lower end of the cutter has teeth that project outwards in order to reduce friction between the cutter and the surrounding earth.

10. A device as claimed in claim 1 including means for removing the core of earth from the cutter.

11. A device as claimed in claim 10 wherein the earth removing means comprises a plunger around which the cutter is arranged to be retracted.

12. A device as claimed in claim 11 wherein the plunger has a free end at substantially the same level as the lower end of the shaft.

13. A device as claimed in claim 1 wherein the cutter has a lower end and includes opposing members pivotally mounted at the lower end of the cutter, movable between an open position and a closed position and arranged to be in the open position during penetration of the ground and be in the closed position during removal of the cutter therefrom.

14. A device as claimed in claim 13 wherein the pivotally mounted members comprise claws for gripping a root of a weed during retraction of the cutter.

15. A device as claimed in claim 1 including means for indicating when the cutter has reached a predetermined position relative to the shaft.

16. A device as claimed in claim 15 wherein the indicating means comprises audible indicating means.

17. A device as claimed in claim 15 wherein the indicating means comprises visible indicating means.

18. A device as claimed in claim 1, including barbs for penetrating leaves or fronds of the weed in order to lift the leaves or fronds with the device.

* * * * *